Oct. 31, 1933.   F. PUENING   1,932,830
APPARATUS FOR HEATING COAL OR THE LIKE
Original Filed Sept. 3, 1927   8 Sheets-Sheet 1

INVENTOR.
Franz Puening
BY Henry Love Clark
his ATTORNEYS.

Oct. 31, 1933.   F. PUENING   1,932,830
APPARATUS FOR HEATING COAL OR THE LIKE
Original Filed Sept. 3, 1927   8 Sheets-Sheet 3
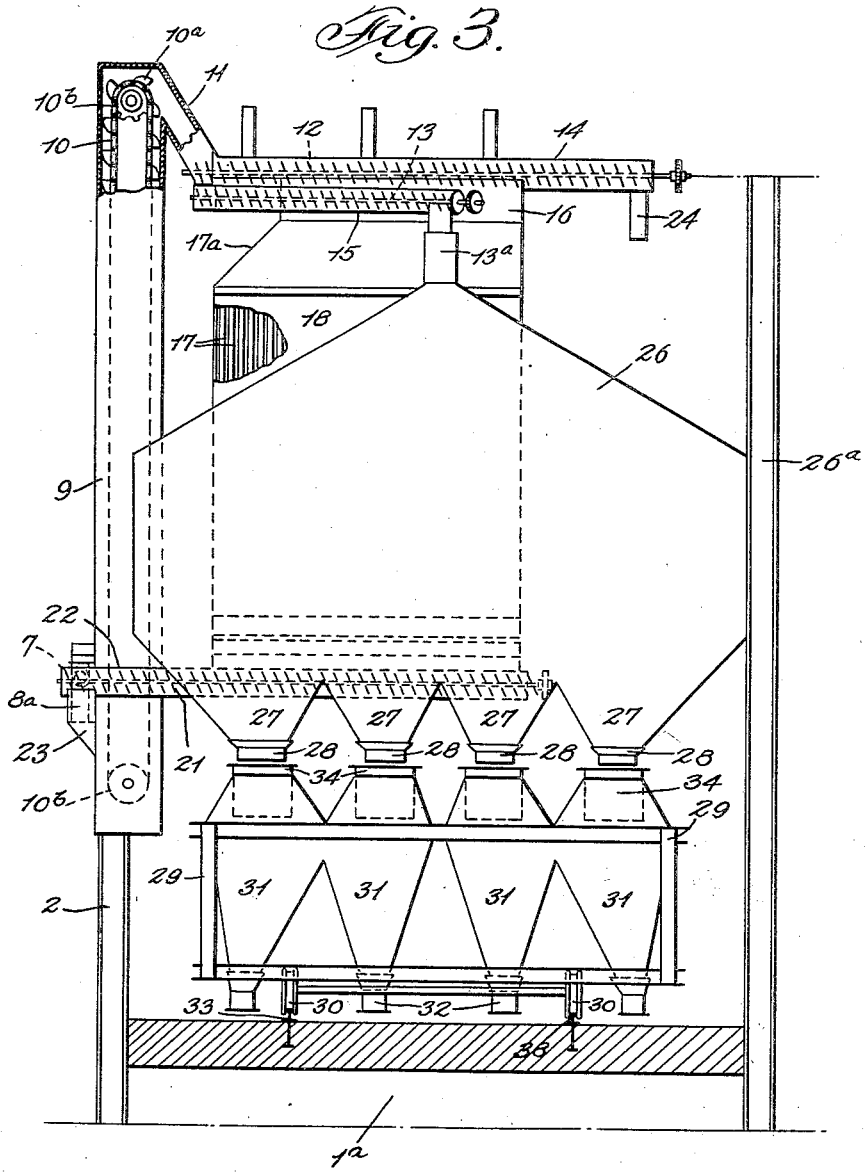
Fig. 3.
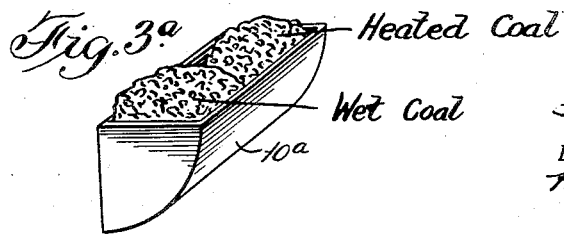
Fig. 3ª.   Heated Coal
Wet Coal
INVENTOR.
Franz Puening
BY
Henry Love Clarke
his ATTORNEYS.

INVENTOR.
Franz Puening
BY
Henry Love Clarke
his ATTORNEYS.

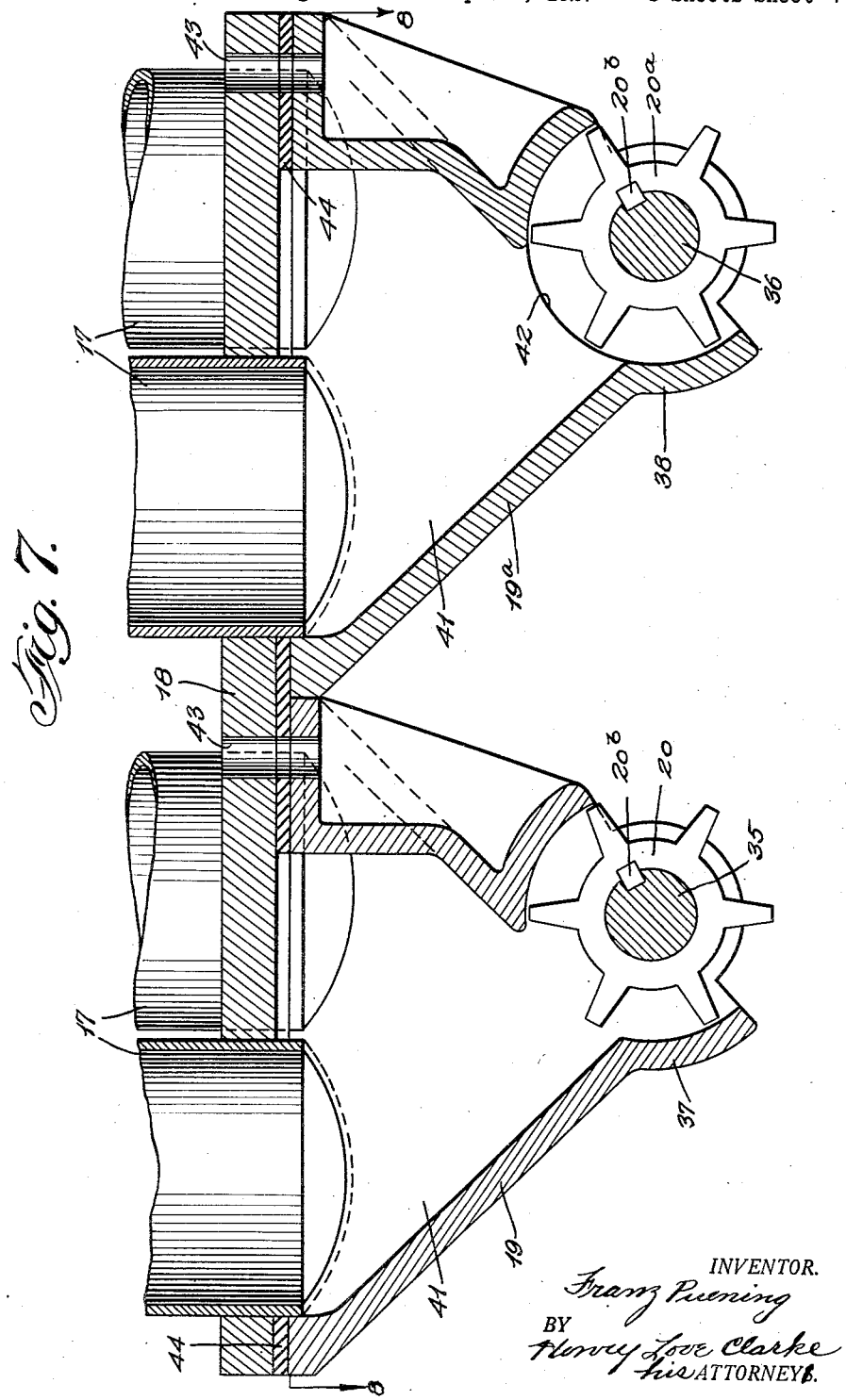

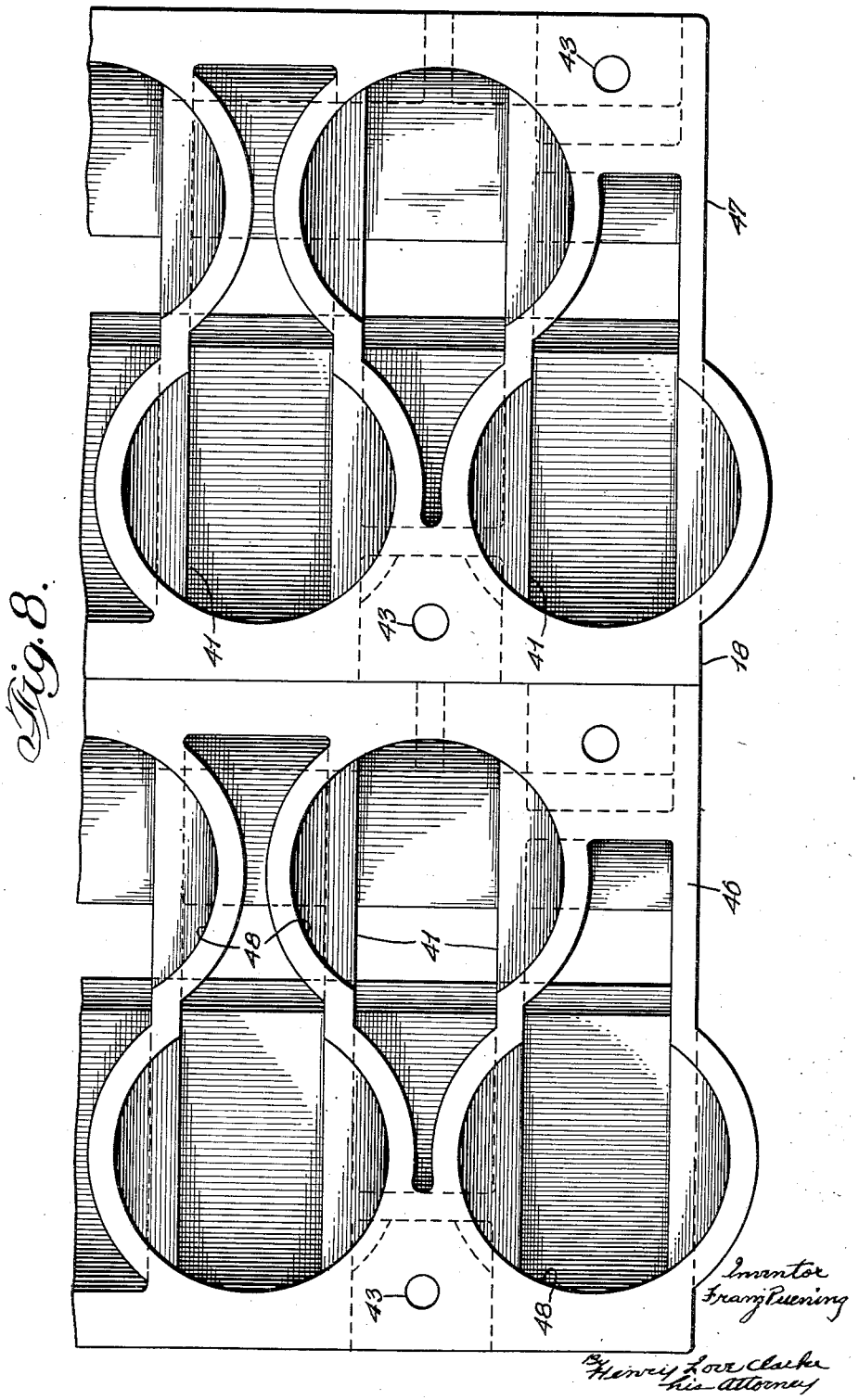

Patented Oct. 31, 1933

1,932,830

UNITED STATES PATENT OFFICE 1,932,830

APPARATUS FOR HEATING COAL OR THE LIKE

Franz Puening, Pittsburgh, Pa., assignor to The Koppers Company of Delaware, Pittsburgh, Pa., a corporation of Delaware Original application September 3, 1927, Serial No. 217,488. Divided and this application September 29, 1930. Serial No. 485,077

7 Claims. (Cl. 34—34)

The invention relates primarily to apparatus for conditioning coal for either high temperature or low temperature coking and has particular relation to apparatus for preheating coal prior to its being charged into the coking ovens or other apparatus to be transformed into coke, and also relates to such apparatus when employed for heating or heat treatment of other carbonaceous materials, as for instance shale. More particularly, the present invention relates to apparatus adapted for carrying out the methods of my copending application Serial No. 217,488, filed September 3, 1927, for method for heating coal or the like, of which this application is a division.

The manufacture of coke for industrial purposes is carried out with greater facility and an improved quality of product is obtained when the charge of coking-coal is introduced into the ovens or other coking apparatus, whether high temperature or low temperature, in a dry and heated condition and completely devoid of moisture. Various methods have been practiced for this purpose and involving the treatment of the raw or wet coal in the storage bins to eliminate the moisture therefrom prior to its being introduced into the ovens.

The present invention contemplates circulation of hot coal for drying wet coal, and apparatus for continuously removing the raw or wet coal from the main storage bins, applying heat thereto to raise the same to the desired pre-coking temperature and eliminating all moisture, and thereafter storing the preheated coal in position for rapid and convenient transfer to the ovens or other coking apparatus to be charged.

A further object of the invention is to provide an apparatus for simultaneously handling the wet and preheated coal and utilizing the heat stored in the latter for removing the moisture from the wet coal prior to introducing the latter to the heating chamber, thereby rendering it possible to more rapidly impart the desired heat to the coal and minimizing the possibility of blocking the apparatus and impairing its continuous operation due to a preponderance of moisture in the wet coal.

A further object of the invention is to provide an apparatus for preheating coking-coal in which the proportion of the dry coal with respect to the raw coal may be increased or decreased conveniently while the material is being continuously conducted through the apparatus as such variations are required by operating conditions, and without interrupting the continuous handling of the material.

A further object of the invention is to provide an apparatus for continuously preheating coking-coal immediately adjacent the coke oven battery and in such manner as not to interfere with charging the ovens with raw coal from the storage bin when desired or when the preheating apparatus is shut down or inoperative.

A further object of the invention is to provide an apparatus for carrying out the improved process of my copending application and composed of comparatively few elements arranged for rapidly, continuously and economically handling the raw and preheated coal prior to its being charged into the ovens, without care or attention on the part of the operators, said elements of the apparatus being designed to be positioned adjacent the coke oven battery, and utilized as incident to the coking of coal according to present methods and standards, without requiring material alteration of the coking apparatus.

The invention further contemplates the utilization of waste heat return from the stack flues of the coal preheating apparatus, with a resulting economy in operation and lessening in heat intensity, but the invention is not limited to the particular heating means described and any desired heating means may be employed.

With such objects in view, or any other advantages which may be incident to the use of the improvements, the invention consists in the apparatus hereinafter set forth or claimed, for carrying the aforesaid method into effect, with the understanding that the elements constituting the various claimed combination may be varied in proportions and arrangement without departing from the nature and scope of the invention. The drawings and descriptive specification show and describe, by way of example, an adaptation of the invention to a standard coke oven for high temperature coking, but the invention is also adapted for employment with low temperature coking ovens or other apparatus.

In order to make the invention more clearly understood there are shown in the accompanying drawings means for carrying the same into practical effect, without limiting the improvements, in their useful applications, to the particular constructions which, for purposes of exemplification, have been made the subject of illustration. In the said drawings:—

Fig. 3 is an end elevation of the structure illustrated in Figs. 1 and 2.

Fig. 3a is a detail perspective view of one of the buckets 10a shown in Fig. 3, and illustrating equal or varied proportions of wet and heated coal in one of the buckets.

Fig. 7 is an enlarged vertical sectional view similar to Fig. 4 and illustrating more clearly the structure at the lower portion of the preheater.

Fig. 8 is a horizontal sectional view on line 8—8 of Fig. 7, the discharger rotors being omitted.

Figure 4:
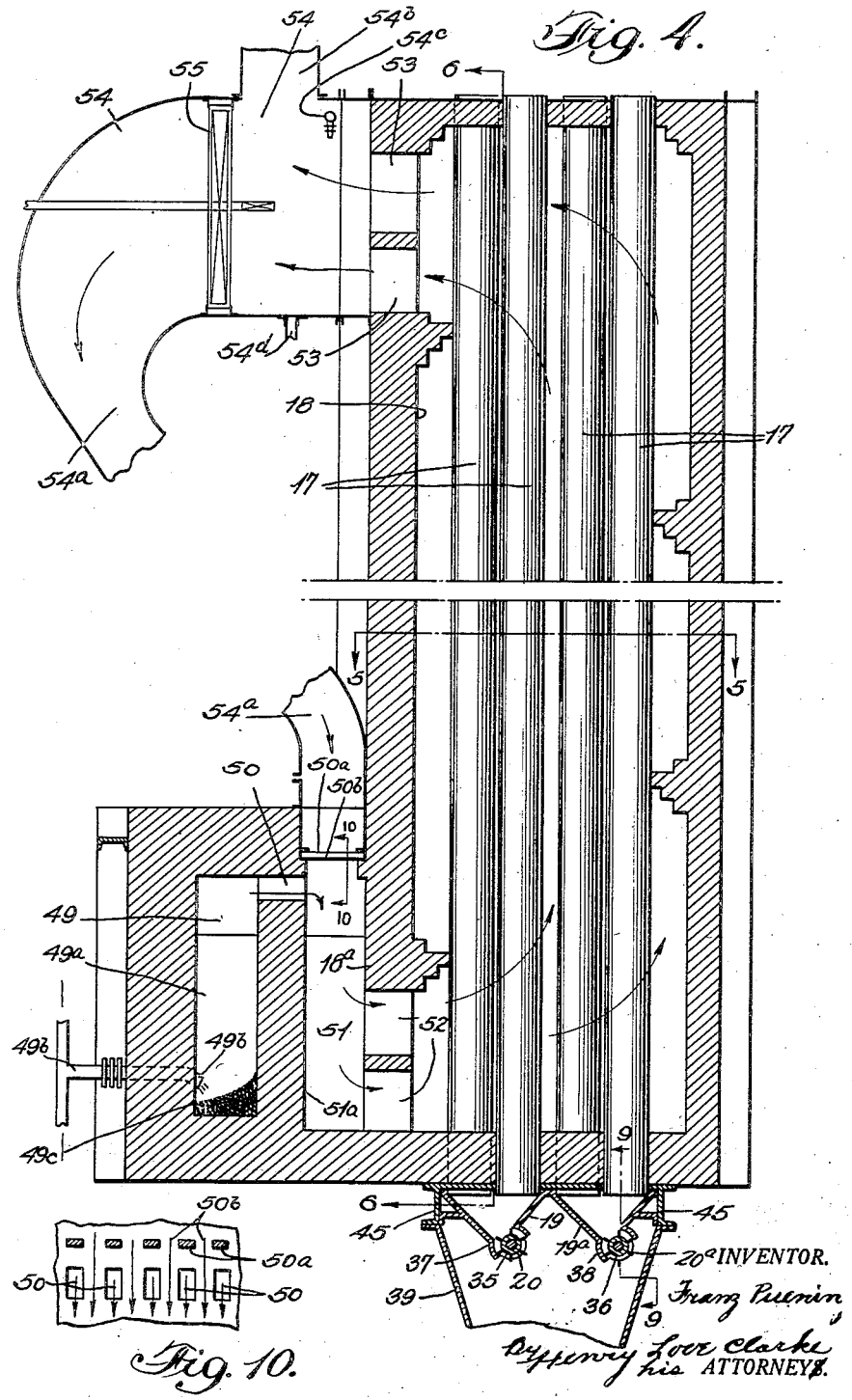
Fig. 4 is an enlarged vertical sectional view of the coal preheater, said view being taken through the preheater chamber only on line 4—4 of Fig. 2.

Fig. 10 is a vertical sectional detail view on line 10—10 of Fig. 4, to show more clearly the arrangement of slots 50 and 54b for the introduction of heating gases into the passage 51 in Fig. 4.

Figure 1:
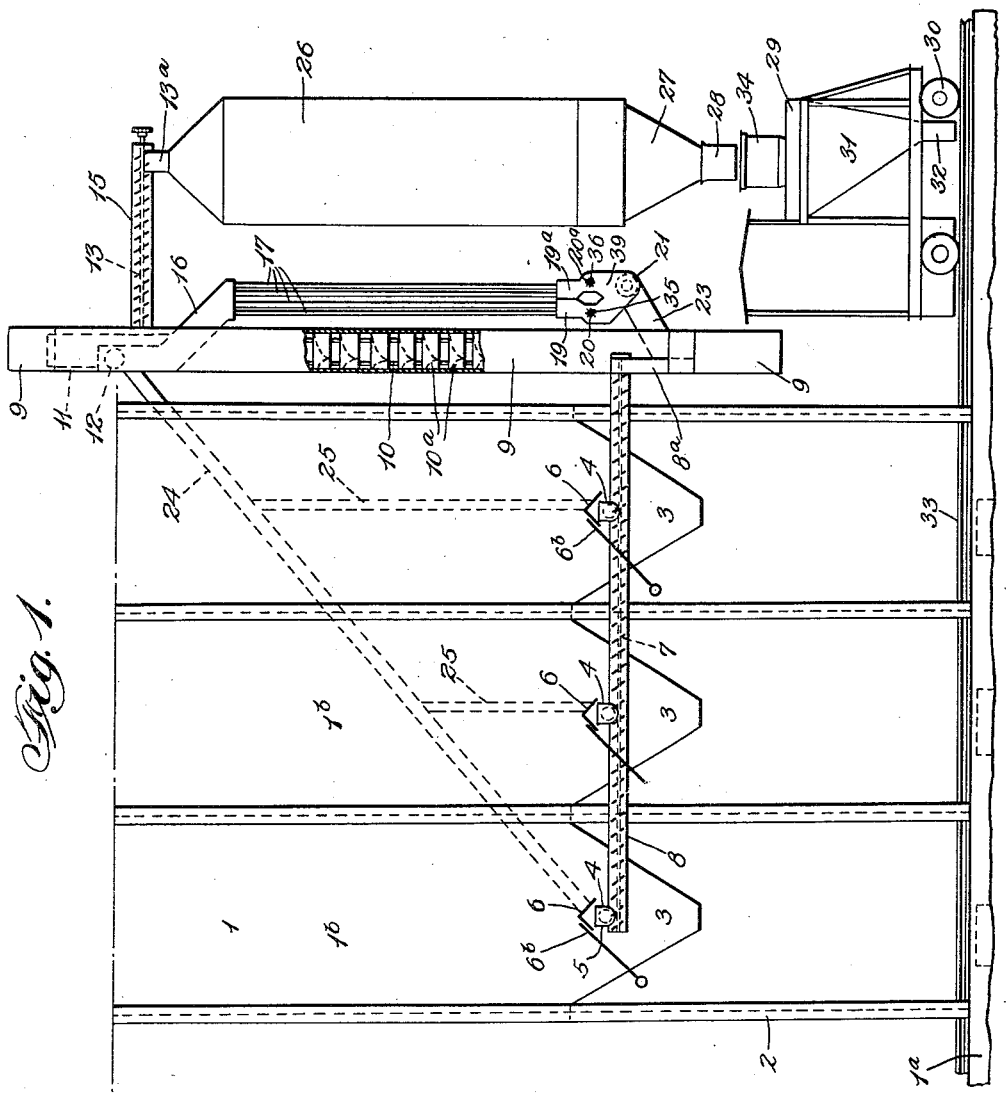
Fig. 1 is a side view, largely diagrammatic in character, showing the elements for carrying out the improved process, positioned above a coke oven battery constituted or horizontally aligned coking retort ovens.
Figure 2:
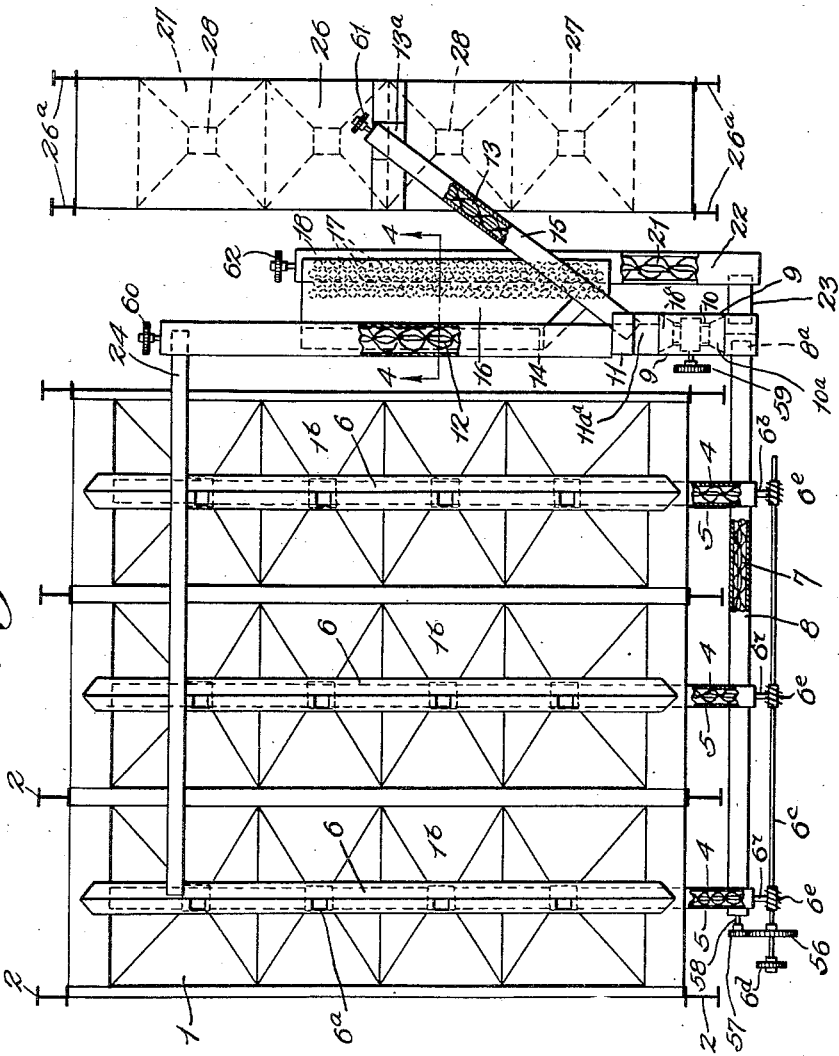
Fig. 2 is a plan view of the same, also largely diagrammatic in character.

Referring to the drawings and with particular reference to Figs. 1, 2 and 3, 1 indicates a coal storage bin for containing the coal to be preheated. The bin 1 is located in any desired position with respect to the oven battery 1a, but is preferably disposed above the battery, and is illustrated as being supported by usual or preferred vertical frame standards or I-beams 2. As best seen in Fig. 1 the storage bin is divided into or constituted of a plurality of contiguous sections 1b with or without intervening partition walls, each section terminated at its lower portion in a tapered discharge hopper 3 having the usual removable closures to permit the removal of coal when desired from said hopper portions. Each section of the storage bin 1 is preferably provided with a horizontally disposed worm or screw conveyor element 4 at or near the lower portion of the bin and extending transversely and for substantially the width of the bin. Each conveyor element 4 is enclosed within a protective housing 5 having a superposed tapered hood 6 which serves to protect the conveyor from the weight of wet coal within the bin. The hood members 6 are provided with a plurality of spaced apertures 6a controlled by slidable shutters or closures 6b and through the medium of which delivery by gravity of wet coal within the bin 1 to the conveyors 4 is controlled. The conveyors 4 are power driven from any preferred source. As illustrated in Fig. 2 a shaft 6c is provided which is driven from a gear 6d connected to the power source, said shaft having a plurality of worm elements 6e meshing with corresponding worm wheels on the outer ends of the shafts 6i of the conveyors 4.

The conveyors 4 extend through the front wall of the bin 1 and each conveyor terminates above and discharges into a single horizontal screw conveyor 7 enclosed within a protective housing 8, and extending longitudinally of the storage bin 1, and communicating at its discharge end by a chute 8a with the lower portion of a vertically disposed elevator housing 9. An endless bucket elevator or conveyor 10 of any preferred type is mounted for vertical travel within the elevator housing 9 and passes over the usual upper and lower sprocket wheels 10b journaled in said housing. The horizontally disposed longitudinal conveyor 7 discharges into the chute 8a and the arrangement of the latter is such that the material or coal carried by the conveyor discharges into one end only of the elevator buckets 10a and said material may by such arrangement constitute approximately one-half or less than one-half of the carrying capacity of said buckets, and is deposited as described at one side of the latter or in the left hand end as viewed in Fig. 1. The elevator 10 is designed to discharge at its upper end into a chute 11 in turn discharging into an upper horizontally disposed conveyor 12 and a second horizontally disposed conveyor 13 arranged at an angle to the conveyor 12. The arrangement is such that as viewed in Figs. 2 and 3, the contents of the left hand ends or corners of the elevator buckets 10a are discharged into the conveyor 12, and the contents or a portion of the contents of the right hand ends or corners of said elevator buckets discharge into the conveyor 13. The conveyor elements 12 and 13 are enclosed within suitable protective housings 14 and 15. The intermediate portion of the screw conveyor 12 communicates with an inclined chute 16 which in turn communicates with the upper ends of a plurality of vertically disposed spaced preheater tubes or conduits 17. The latter are contained within a heating chamber 18 (which has been omitted for clearness in Fig. 1), and the lower ends of said tubes communicate with a pair of chutes or hoppers 19 and 19a (Fig. 1) forming an enclosing housing and having restricted portions in which are mounted on two parallel shafts 35 and 36 a plurality of spaced discharger rotors 20, 20a. A horizontally disposed transverse screw conveyor 21 is enclosed within a protective housing 22 and is designed to receive the material from the discharger rotors 20, 20a, and convey the same to an inclined chute 23 communicating at one end with the discharge end of the conveyor 21 at the forward end of its housing, said chute communicating at its lower end with the elevator housing 9, and designed to discharge into the right hand ends or portions of the elevator buckets 10a. Any surplus material which is not discharged by the conveyor 12 into the chute 16 is carried to the inner end of said conveyor and discharged into an inclined overflow chute 24 and thence returned by gravity and by vertical branch chutes 25 to points adjacent the transverse screw conveyors 4 in the main storage bin 1 (Figs. 1 and 2).

The inner end of the angularly disposed horizontal conveyor 13 communicates with and discharges into the upper reduced portion 13a of a hot coal bin 26 which, similar to the bin 1, is preferably constituted of a plurality of contiguous aligned sections, each having a lower hopper portion 27 provided with a suitably controlled discharge orifice 28. The hot coal bin 26 is supported in any desired or preferred manner as by vertical supports or I-beams 26a, adjacent the preheater tubes 17 and above the coke oven battery. The discharge orifices 28 of the hoppers 27 are designed to discharge into corresponding charging openings 34 of a larry car 29, having flanged wheels 30 and a plurality of hoppers or compartments 31, each of the latter being provided with a reduced discharge portion or nozzle 32. The larry car 29 travels upon rails 33 laid longitudinally on the top of the oven battery and is designed to discharge its contents through the reduced nozzles 32 into the usual charging doors (not shown) at the top of the various ovens of the battery.

Figure 5:
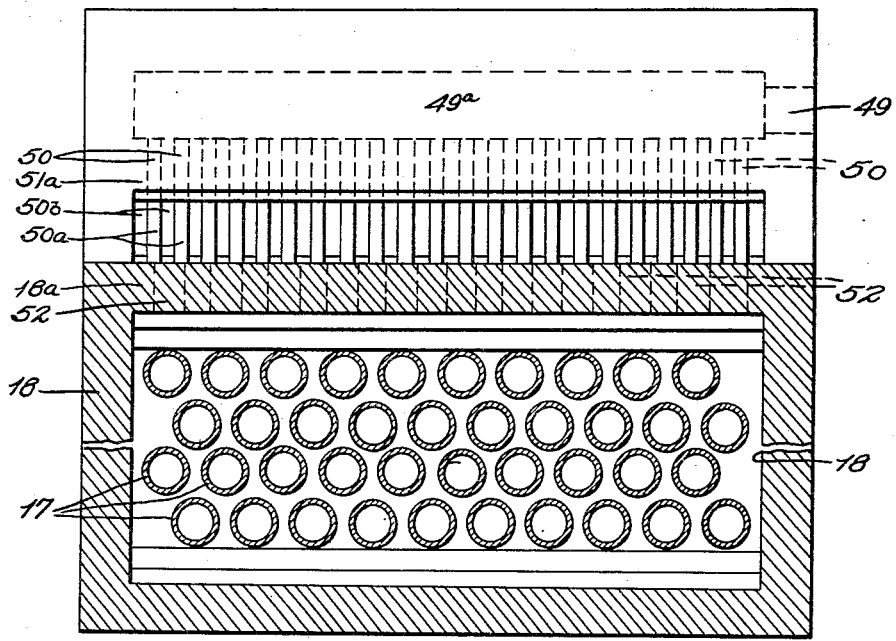
Fig. 5 is a horizontal sectional view on line 5—5 of Fig. 4.
Figure 9:
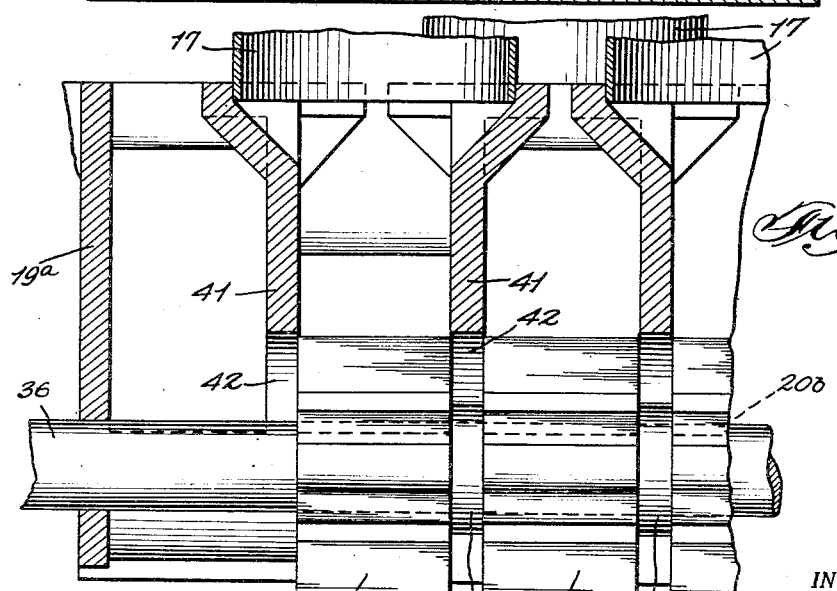
Fig. 9 is an enlarged detail vertical sectional view on line 9—9 of Fig. 4.
Figure 6:
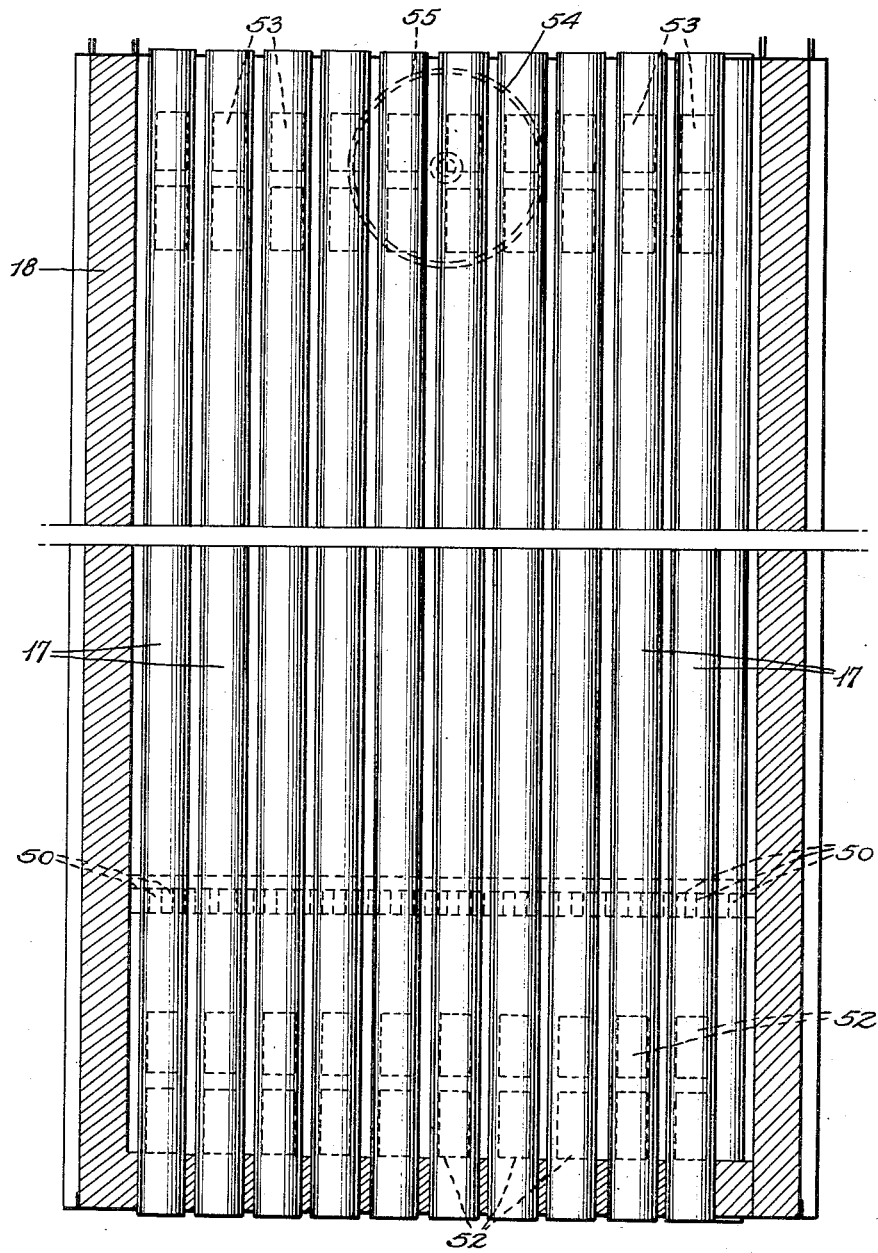
Fig. 6 is a vertical sectional view on line 6—6 of Fig. 4.

As best seen in Figs. 4 and 5, the preheater tubes 17, of sheet metal are or may be arranged in two (or more) spaced apart pairs of closely spaced rows within the heating chamber 18 and in alternate or staggered relation. This design and arrangement of the tubes obtains a minimum area of the heating chamber with maximum of tubes of relatively small diameter, as well as convenience in the arrangement and operation of the discharger rotors 20, 20a. The latter are keyed as 20b on the two parallel shafts 35 and 36 respectively journaled in the reduced intermediate portions 37 and 38 of the hoppers or chutes 19 and 19a, and one rotor 20 or 20a is provided for and beneath each of the staggered tubes 17, to insure a uniform flow through each tube. The preheated coal discharged from both pairs of staggered tubes is conducted by the chute 39, beneath the discharger rotors, to the conveyor 21.

As best seen in Figs. 4, 7, 8 and 9, the discharger rotors 20, on shaft 35 extending longitudinally of the preheater, are disposed within the restricted portion 37 of the hopper or chute 19 and take care of the discharge from the two left hand rows of preheater tubes 17. The discharger rotors 20a on the companion shaft 36 are disposed within the restricted portion 38 of the hopper or chute 19a and take care of the discharge from the right hand rows of preheater tubes 17. The rotors 20 and 20a are suitably spaced as by collars 40 on their respective shafts 35 and 36 in such manner that one rotor is provided beneath and takes care of the discharge from each preheater tube 17. Or the rotors may be long enough to extend under several or many of the preheater tubes 17. Suitable partition walls 41 are provided within the chutes 19 and 19a to direct the discharge from the tubes to their respective rotors, said partition walls being apertured as at 42 (Fig. 9) to provide clearance for the shafts and rotors when the apparatus is assembled. The chutes 19 and 19a may be removably secured to the bottom of the preheater chamber 18 as by bolts or rivets extending through aligned apertures 43 in the respective elements (Fig. 7). A suitable intermediate fluid tight packing 44 may be provided to insure against the escape of heating gases from within the chamber 18. As best seen in Fig. 4 the outer enclosing chute 39 may be bolted or otherwise secured to longitudinally extending channel beams 45 which serve to support the preheater structure above the coke oven battery. The top portion or walls of the contiguous chutes 19, 19a may consist of one or more aligned metallic castings 46 and 47 having apertures 48 therein corresponding in number and arrangement to the tubes 17 and through which apertures the preheated coal is discharged from said tubes into the bottom portion of said chutes or hoppers 19 and 19a. The apertures 48 are or may be extended at one side to facilitate the discharge of heated material from the tubes toward their respective discharger rotors, it being noted that the left hand row of tubes of each pair as seen in Figs. 7 and 8, discharges toward the right hand, and the right hand tube of each pair of discharges toward the left.

The heating medium for externally heating the tubes 17 within the chamber 18 consists of combustion gases from any convenient fuel such as gas, oil, coal or coke. Referring to Figs. 4 and 5 the fuel, for instance gas, with air, is admitted to the combustion chamber 49a primarily through the port 49 and injector burner 49b, and after combustion the heating gases pass through slots 50, passage 51 and ports 52 to the main portion of the heating chamber 18. Impingement of the combustion gases upon the carborundum pebbles 49c promotes quick surface combustion of such gases within the chamber 49a. The gases so introduced to chamber 18 are circulated throughout and externally of the tubes 17 to maintain the latter at the required temperature for preheating the coal therein, and the heating gases escape from the upper portion of the chamber through the ports 53. A hood 54 is provided having a suction fan 55 therein, by means of which a portion of the heating gases is continuously recirculated, throughout the chamber 18 through the upper and lower ports 53 and 52; and the extension 54a of the hood 54 and a suitable offtake pipe or chimney 54b are provided communicating with said hood, through which the surplus of the heating gases, introduced at 49 and 49a, escapes to the atmosphere. The fresh combustion gases admitted at 49a, which are of too high a temperature for contact with the preheating tubes are thus by recirculation of a portion of the exhausted gases, by means of the fan 55, reduced in temperature before they come into contact with said tubes. The mixing of fresh and recirculated gases is thorough because of the lamination of the gas streams. If the recirculated gases are too hot for the fan, the water spray 54c will take up the excess temperature. The water drain 54d will drain the surplus water from such spraying.

More particularly describing the above mentioned lamination of the gas streams, it may be noted that new gases and air are supplied through burner 49b and completely burned, preferably in contact with the carborundum pebbles 49c to promote quick surface-combustion, in combustion chamber 49a; then pass through slots 50 in many small streams or sheets. The bars 50a forming slots 50b divide the recirculated gases in many fine sheets which are sandwiched between the sheets of new hot gases. In this manner a very intimate mixture of gases is produced and before they pass through the ports 52 and come into contact with the heating tubes they have a uniform reduced temperature, whereas if this lamination of gases was omitted there would be a tendency for the recirculating gases to continue unmixed down along the wall 18a and the hot gases to be crowded down and pass along the wall 51a causing one stratum of hot gas and one of cooler gas.

The longitudinally extending conveyor 7 may be driven from any power source. As illustrated a gear 56 on power shaft 6c meshes with and drives a companion gear 57 on the shaft 58 of the conveyor 7 (Fig. 2). Power for operating the endless elevator 10 may be applied in any approved manner and may drive gear 59 secured on one of the sprocket shafts of the elevator. The respective conveyors 12, 13 and 21 may be driven by suitable power connected to the sprocket or gear wheels 60, 61 and 62 secured on the inner ends of the respective conveyor shafts. Any desired power source may be employed for driving the companion shafts 35 and 36 carrying the individual discharger rotors 20, 20a for discharging and preventing the agglomeration of heated coal in the chutes 19, 19a.

The method of operation of the elements described, and best seen in Figs. 1 to 3, for preheating the coal to be charged into the ovens is briefly as follows: Assuming the hot bin 26 to be empty, the wet or raw coal in the main storage bin 1 is carried by the transverse screw conveyors 4 into the longitudinal screw conveyor 7 and is discharged thereby through chute 8a into the left hand portions of the endless buckets 10a within the elevator housing 9. The buckets which at this time contain no material in their right hand portions, elevate the coal and discharge it into the upper transverse conveyor 12 which receives the wet coal and discharges it into the chute 16 and thence the coal is discharged by gravity into the upper ends of the preheater tubes or flues 17. Any surplus wet coal that can not pass through the tubes, due to the speed to which the rotors 20 and 20a are adjusted, is automatically discharged by the conveyor 12 into the overflow chute 24 and is returned thereby to the empty end of one of the conveyors 4.

The preheater tubes enclosed within the housing or chamber 18 may be externally heated to a relatively high temperature by any other preferred heating medium. For example, the waste heat from the stack flues of the coke ovens, which is at a temperature of approximately 600° F. may be directed into the preheating chamber 18 in a manner heretofore described and circulated between the tubes. In such case the recirculation of waste gases by fan 55 is superfluous, since gases of 600° or 700° F. will not injure the tubes. It is not intended that the present method be limited to the particularly described heating means or medium, and the necessary temperature of the preheater tubes may be obtained by utilizing heat from other sources, and circulated within the heating chamber in any preferred and approved manner.

The wet coal passes downwardly through the tubes 17 and is heated therein to a temperature above dryness, i. e., above 212° F., and safely below the fusing point of coal, which is near 600° to 700° F. The exact point to which the coal will be preheated, in this range between 212° F. and 500° or 600° F., which would be sufficiently below the coal-fusing point, depends on the kind of coal and other factors. When employing waste gases from the ovens it is apparent, from the temperature of those gases and their heat content, that the coal can be preheated by them to only a temperature slightly in excess of dryness.

In this connection it will be observed that the several tubes 17 are of relatively small diameter as compared to their longitudinal dimensions, which results in the coal being evenly and thoroughly heated during its passage through the tubes by means of the heat within the chamber 18, and all moisture is dispelled from the coal. The heated coal collects in the chutes or bins 19 and 19a, and the coal from each tube is fed downwardly by means of its individual discharge rotor 20, 20a, the rotors being rotated on their shafts 35 and 36 by any appropriate power source. These rotors determine the speed of movement of the heated coal through the tubes. The heated coal is received by the transverse conveyor 21 and conveyed forwardly thereby and discharged into the chute 23 and thence into the right hand portions of the endless conveyor buckets 10a within the elevator housing 9. These buckets which are still receiving wet coal in their left hand portions from the bin 1 in the manner described, now carry upwardly separate and individual charges of wet and dry coal (see dotted line in elevator buckets in Fig. 1). During their upward travel within the elevator housing the raw or wet coal charge is subjected to an initial heat from the charge of hot coal carried by the same bucket, and the heating up of the wet coal is continued and intensified when both coals enter the upper transverse conveyor 12 in which they are thoroughly mixed, so that the moisture in the wet coal is speedily evaporated and, when the mixture enter the preheater tubes through the chute 16, caking in the tubes is avoided.

The wet coal and dry coal which are being mixed in the big top conveyor 12 may not find time enough to evaporate all the moisture contained in the wet coal, by virtue of contact with hot coal. This question of time merely depends on the size of the conveyors 12 and the volume of coals passing through. In case all water in the wet coal is not evaporated, some wet coal or partially wet coal will enter preheater tubes 17. This, however, is not objectionable as long as the amount of dry hot coal present in the tubes 17, simultaneously with the wet coal, is so preponderant in amount and weight that the mixture of wet and dry after reaching equilibrium of temperature is of such degree of temperature that steam created from the wet coal cannot condense and form a wet cake or clump. In other words, the mixture entering the tubes must be safely above 212° F. The mixture of hot and wet coal which has been agitated in screw conveyor 12 is given certain room in which the water can evaporate before entering the tubes. This room consists in the chute 16 between screw conveyor 12 and tubes 17. By making this room larger additional time can be given. The one side wall 17a of this room is so positioned as to prolong the time that the mixture of wet and dry coal stay in the conveyor 12, for better drying, before the coal can fall into the preheater tubes or conduits 17.

When the elevator buckets, each carrying individual charges of wet and heated coal, reach the upward extent of their travel, the wet coal which has been subjected to initial radiated and conducted heat from the hot coal charge, is conveyed to the top of the preheater tubes by conveyor 12 and chute 16 as above described. The individual charges of hot coal in the buckets are discharged into the upper horizontal conveyor 13 which diverges at an angle to the conveyor 12. The hot coal is discharged by the conveyor 13 into the restricted portion 13a of the hot bin 26 and is stored therein until it is desired to charge the individual and contiguous ovens of a battery. At such time this preheated coal, which is entirely devoid of moisture and has the desired temperature in the hot bin, is discharged through the individually controlled apertures 28 of the bin into the corresponding compartments or hopper 31 of the larry car 29. The latter is then transferred along the rails 33 into position above any desired oven to be charged, and the preheated coal is discharged into the ovens through the discharge spouts 32 of the larry car.

The storage bin 1 for the raw or wet coal is of large capacity, relative to the hot coal bin 26, because preferably the big bin 1 is filled during the short day-labor shift with enough raw or wet coal for at least the whole twenty-four hour day continuous operation of the oven battery but the preheating apparatus is run continuously, so that the relatively small bin 26 is required to hold at any one time only enough coal for a fraction of the full day's consumption, say six or eight hours; and thus not only is the preheated coal maintained always in the best condition for charging into the ovens but also there is avoidance of all danger that might be incident to keeping too great a bulk of heated coal in storage.

It will be observed that by the method and apparatus of the invention the respective ovens of the battery are provided with individual charges of preheated coal, which is a distinct economic advantage in the subsequent production or manufacture of coke in the ovens. The time required for coking is materially decreased and a product of higher quality is thereby obtained.

In the practice of the invention as thus far described, the wet coal is given but a single passage through the preheater tubes. In other words, as an example, one ton of wet coal is removed from the main storage bin, and elevated by the buckets 10a to be discharged into the conveyor 12 and thence into the top of the preheater tubes, the coal occupying substantially one-half of the capacity of the elevator buckets. The preheated coal is again transferred to and elevated by the elevator buckets and discharged into the hot bin 26, the heated coal at this time occupying substantially one-half of the capacity but in the opposite ends of the elevator buckets. The elevator 10 constitutes the only element of the apparatus which handles two tons of coal per unit of time, namely one ton of wet coal in the left hand ends of the buckets and one ton of dry coal in the opposite ends of said buckets.

But the proportion which the wet coal bears to the dry or preheated coal during the carrying out of the process throughout the apparatus may be greatly varied to conform to operating conditions, and the coal to be preheated may be given more than one passage through the preheating tubes whenever necessary or advisable. This is accomplished by changing or varying the speed of the rotors and of the elevator 10 and the several conveyors relative to one another. In fact it is found that the coal from the main storage bin is often so wet that it would tend to stick and fail to enter the tops of and slide down through the preheater tubes 17. To remedy this, the number of revolutions of the discharger rotors 20, 20a and conveyors 12 and 21 and the speed of elevator 10 may be increased, with the speed or number of revolutions of transverse conveyors 4 and communicating longitudinal conveyor 7 remaining the same. This results in the amount of wet coal removed from the main bin 1 remaining constant, or, as stated above, one ton of coal per unit of time. However, the amount of coal passing through the preheater tubes or conduits has been increased to, for example, four tons per unit of time. The buckets 10a of the elevator will be filled at their left hand corners with one ton of wet coal and at their right hand corners with four tons of dry coal which latter has passed once through the preheater tubes 17. This preponderance of dry coal serves to increase the speed with which the wet coal is heated up and dried after it has been discharged at the top of the elevator and has been thoroughly mixed with the dry coal passing along the screw conveyor 12. This results in all moisture being evaporated from the wet coal prior to its being conducted to the top of the preheater tubes 17, thereby eliminating the possibility of the coal blocking and refusing to enter and slide through the preheater tubes. By variations of the process described any proportion of wet and dry coal may be conducted through the preheater tubes, thereby rendering it possible to reduce the diameter of the latter with resulting economies, as well as increasing the speed of travel of the coal through the preheater.

This adaptability and adjustability of the method and apparatus therefor to various coals and to various degrees of moisture in the same coal, is one of the most important and useful aspects of the invention.

It will be understood that the apparatus herein described and claimed may be employed for the heating or heat treatment of carbonaceous materials other than coal. For instance, it may be adapted to and employed for not only the drying or preheating of other carbonaceous materials but also for the heat treatment or distillation of such carbonaceous materials as shale. And it will be understood that in the claims hereinafter made the term coal is employed in a generic manner to indicate true coal or any of the various related carbonaceous material or such other carbonaceous materials as shale, or the like.

This invention has been set forth as embodied and practiced in a particular example, but it is not limited thereto and may be variously embodied and practiced within the scope of the claims hereinafter made.

I claim:

1. An apparatus for heating coal or the like comprising a storage bin, means for removing raw material from said bin, a preheater constituted of a plurality of conduits disposed within a heating chamber, means for receiving the material from said removing means and discharging the same into the top of said preheater, means for transferring the heated material from said preheater and conducting the same to a collection receptacle, said material receiving means simultaneously conveying the raw and at least a portion of heated material, respectively, to said preheater and said collection receptacle, and means for externally heating said preheater conduits.

2. An apparatus for heating coal or the like comprising a storage bin, conveyors for continuously removing raw carbonaceous material from said bin, a preheater constituted of a plurality of vertical conduits disposed within a heating chamber, means for admitting a heating medium to said heating chamber, an elevator for receiving the raw material from said conveyors, a second conveyor for receiving the raw material from said elevator and discharging the same into the top of said preheater conduits, means for continuously transferring the heated material from said preheater, and a third conveyor for returning the heated material to said elevator, a hot bin, and a fourth conveyor extending between said elevator and said hot bin, whereby said elevator simultaneously conveys the raw and at least a portion of the heated material, respectively, to said preheater and said hot bin.

3. An apparatus for heating coal or the like, comprising a storage bin, means for removing wet carbonaceous material from said bin, a preheater adjacent said bin, an elevator for receiving the wet material from said removing means and discharging the same into the top of said preheater, means for discharging the heated material from said preheater, and returning the same to said elevator, whereby said elevator simultaneously conveys the raw and heated material toward said preheater, and means co-operating with said elevator for transferring at least a portion of the heated material to an independent storage receptacle.

4. An apparatus for heating coal or the like, comprising a storage bin, conveyors for continuously removing the raw material from said bin, a preheater disposed adjacent said bin and constituted of a plurality of vertical conduits open at their ends and arranged within a heating chamber, independent conveyors for charging the upper ends of said conduits with raw carbonaceous material and removing heated material from the lower ends of said conduits, an elevator for simultaneously receiving the raw and heated material from their respective conveyors, and a collecting bin communicably connected with said elevator, whereby said elevator simultaneously conveys respectively the raw material along with a portion of the heated material to said preheater and another portion of the heated material to said collecting bin.

5. A heater for coal or the like comprising a heating chamber; a plurality of conduits for carbonaceous material disposed within said chamber through which the coal passes; a combustion chamber; connection means for admitting combustion gases from the combustion chamber to said heating chamber externally of said conduits; means for returning a portion of the waste heat gases from said heating chamber to said connection means for admixture therein with fresh combustion gases admitted to the heating chamber; and means in said connection means for effecting said admixture by lamination of streams of the waste heat gases with the fresh combustion gases comprising two mutually staggered series of bars, one of which is interposed in the path of the return waste heat gases and the other of which is interposed in the path of the fresh combustion gases entering said connection means, and both of the two series of bars being located at the place of meeting of the two kinds of gases in the connection means for admission into the aforesaid heating chamber.

6. A preheater system for coal comprising, a heating chamber adapted for preheating of said coal therein, a hot-storage-bin for storage of heated coal from said heating chamber, supply means for supplying raw coal, an elevator means that is adapted to elevate raw coal from said supply means to the heating chamber, means for conveying hot coal from said heating chamber to said elevator means and adapted for depositing the hot coal on the elevator means next to but so as to be individually separable from the raw coal elevated therewith by said elevator means, means for conveying the raw coal from said elevator means to said heating chamber, and means for conveying the individually separable hot coal from the elevator means to the hot-storage-bin.

7. A heater for coal comprising a heating chamber, a plurality of parallel rows of coal heater tubes vertically disposed within said chamber and open at their upper and lower ends and adapted for passage of coal therethrough, the tubes of one row being staggered relative to and nested closely adjacent those of an adjacent row, and a coal chute beneath said chamber and communicating with the lower ends of the coal heater tubes and adapted to receive the discharge of heated coal therefrom; and in which each of said tubes is provided with a discharge rotor individual thereto for controlling the discharge therefrom, and in which the discharge rotors of a plurality of the parallel rows of tubes are mounted on a common shaft adapted to serve for supporting and rotating the discharge rotors of two parallel rows of tubes.

FRANZ PUENING.